Figure 4:
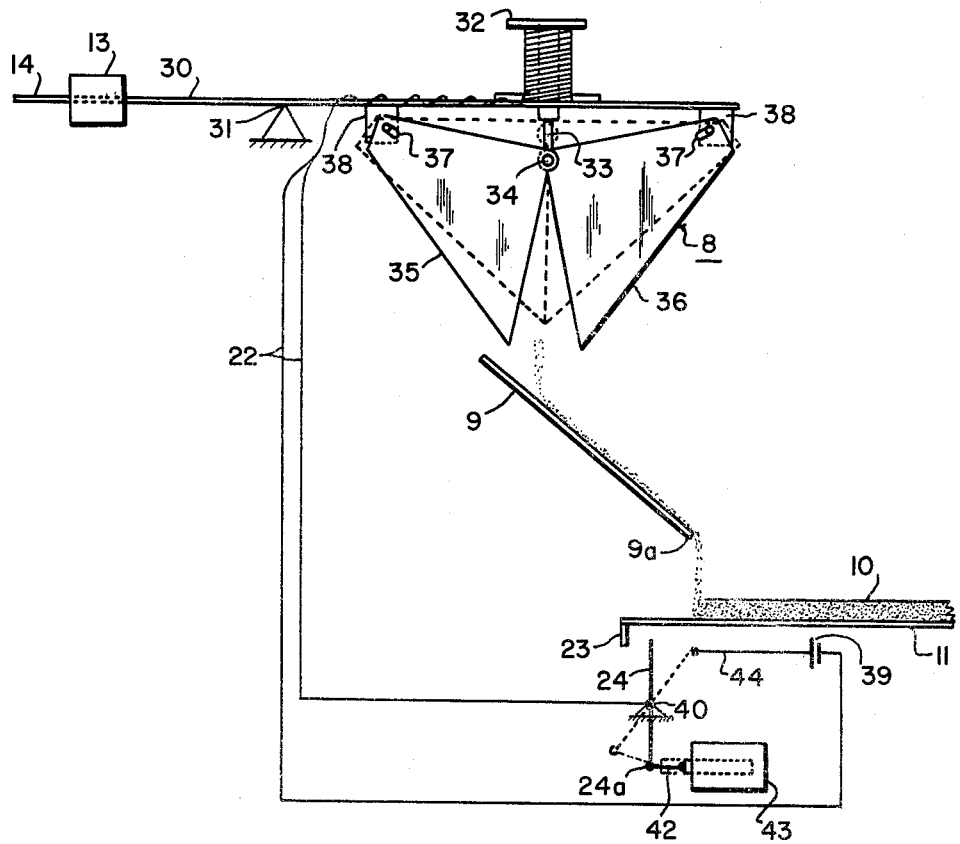

Jan. 12, 1965   H. G. SASS ETAL   3,165,195
APPARATUS AND METHOD FOR REGULATING THE DELIVERY
OF WOOD CHIPS ONTO A RUN-OUT CONVEYOR
Filed Aug. 7, 1962   2 Sheets-Sheet 1
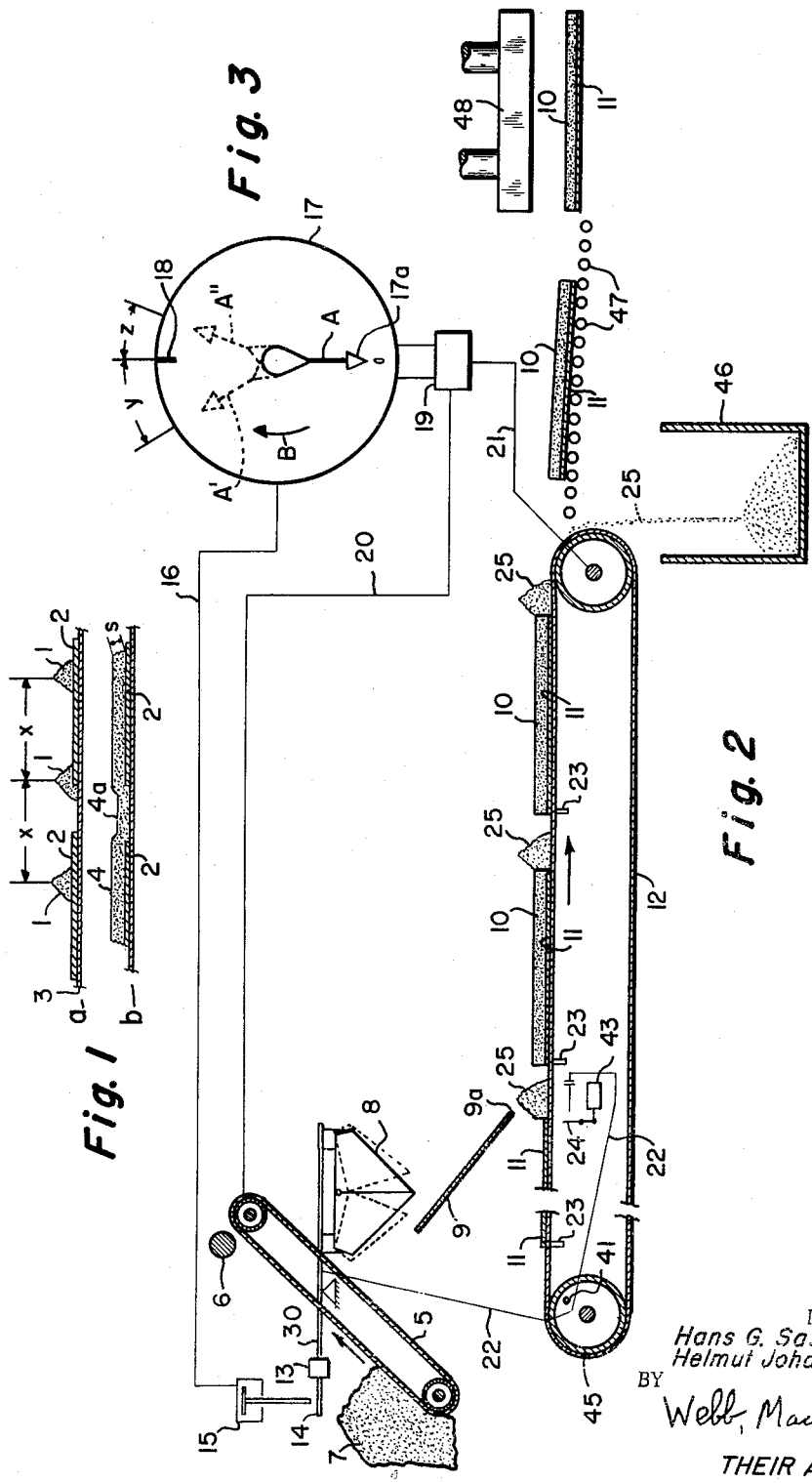
INVENTORS.
Hans G. Sass
Helmut Johann Spielvogel
BY Webb, Mackey & Burden
THEIR ATTORNEYS

United States Patent Office 3,165,195
Patented Jan. 12, 1965

3,165,195
APPARATUS AND METHOD FOR REGULATING THE DELIVERY OF WOOD CHIPS ONTO A RUN-OUT CONVEYOR
Hans G. Sass and Helmut Johann Spielvogel, Krefeld, Germany, assignors to Industrie-Companie Kleinewefers Konstruktions- und Handelsgesellschaft m.b.H., Krefeld, Germany, a corporation of Germany
Filed Aug. 7, 1962, Ser. No. 215,415
Claims priority, application Germany, Aug. 12, 1961, J 20,392
13 Claims. (Cl. 198—37)

This invention relates to apparatus and method for regulating the delivery of wood chips onto a run-out conveyor.

A device is already known for weighing and distributing the weighed batch of wood chips mixed with binding agents for producing wood-chip sheets, said device being provided with a feed conveyor which feeds the chips to a weighing hopper. When a given weight has been reached, the feeding of the wood chips to the weighing hopper is temporarily interrupted. The weighing of batches in the hopper and the discharge therefrom are carried out periodically by means of a continuously rotating cam plate which opens and closes the hopper. It also stops the feed conveyor during discharge of a batch and starts it after each discharge. Due to the periodic opening and closing of the weighing hopper which delivers the chips to a run-out conveyor, mounds of chips accumulate at spaced intervals along the run-out conveyor and it is therefore necessary to provide means for regulating the set height of the bed or layer on the run-out table, said means being provided on the run-out table for the purpose of achieving uniformity in the height of the layer. In this known device, the volume of the mounds and the distance between the individual mounds of chips must conform perfectly to the set height of the layer. If the volume of chips in the mounds is too small or the distance between the mounds is too great in proportion to the set height of the layer, then sections of lesser thickness will occur in the chip sheet. If the volume of material in the mounds is too great or the distance between the mounds is too small in proportion to the set height of the layer, then an excess of chip material will be formed in front of the device for regulating the height of the layer, which usually leads to a strong compression of the chip layer. For these reasons, in the practical embodiment of said device, a precisely measured volume or a set height of the layer was not strictly attained.

The practice is also known of continuously weighing the chips used for making wood chip sheets on a belt-scale and by means of the latter of regulating the feed to the scale, or the speed of the scale itself.

Furthermore, there are other known devices for weighing fibrous or chip-like materials which are delivered whenever a given regulatable weight is reached. Until this weight is reached, for example, the trap doors of the weighing device remained closed and the material fed to it collects in said weighing device.

It is an object of the invention to provide a device for volumetric regulation of wood chips for the production of wood chip sheets by means of controlling the weight. Thus it is possible on the one hand to precisely check the weight and thereby the volume of the chip sheet while requiring no equalizing, while on the other hand the device may be constructed with conventional, simple and inexpensive means. The weight checking is accurate because the effects of the piling up or deficiency of the chips has here been avoided.

In order to attain this objective, the invention provides a device of the above-mentioned type wherein the weight is regulated at time intervals between periods of equal or approximately equal volumetric regulation. Regulating the weight serves to regulate the volume in this manner, that the amount of material fed to the spreader plates or to the conveyor belt which receives the material is relatively or actually increased or decreased.

The time intervals at which determinations of the weight of chips fed to the hopper is accomplished may be constant. Thus, for example, the time intervals between weighings may be controlled by the speed of the feed conveyor belt which feeds chips to the hopper. On the other hand, the time intervals may be made dependent upon the speed of the run-out belt. Thus, for example, when using spreader plates on the run-out belt these plates may be provided with projections so that the weighings will take place in that interval of time in which the trailing end of one spreader plate and the leading end of the following spreader plate pass a given point in the path of movement of said plates. For this purpose, the trailing end of each spreader plate may be provided with a switching means to close the hopper and start a weighing.

Preferably the weighings are conducted by means of a conventional weighing hopper coupled to a mechanism for comparing the actual time required for weighing with the constant or adjustable nominal or desired time. For this purpose the time comparison mechanism is connected by way of an impulse transmitter either to the conveying means, which conveys the material to the weighing hopper, or to the run-out belt.

The present invention relates to apparatus for regulating the delivery of wood chips onto a run-out conveyor in order to obtain a layer of desired height. The apparatus comprises a weighing hopper, a feed conveyor for delivering chips to the hopper, a run-out conveyor for receiving chips from the hopper, means for opening the hopper to allow chips from the feed conveyor to pass therethrough and to be delivered on the run-out conveyor, and means for closing the hopper to collect therein a batch of chips of predetermined weight and to thereafter open the hopper to discharge the batch onto the run-out conveyor. The apparatus also comprises a timing device for comparing the actual time required to collect the batch of predetermined weight with the nominal time desired for collecting the batch. It also includes means operative in accordance with the time comparison for regulating the relative speeds of the feed conveyor and the run-out conveyor in order to obtain a layer of desired height.

The present invention also relates to a method of regulating the delivery of wood chips onto a run-out conveyor in order to obtain a layer of desired height for making chip sheets. The method comprises feeding chips such as from a feed conveyor through an open weighing hopper onto a run-out conveyor, closing the hopper and continuing movement of the feed conveyor and collecting therein a predetermined weight of the chips, opening the hopper when the predetermined weight of chips has been collected, and comparing the actual time required to collect the predetermined weight of chips with the nominal time desired for collecting the predetermined weight of chips. The method also includes regulating the relative speeds of the feeding or the feed conveyor and the run-out conveyor to obtain a layer of desired height on the run-out conveyor, this regulation of the relative speeds of the feeding and of the conveyors being made in accordance with the time comparison.

The drawings illustrate an exemplified embodiment of the device.

FIGURE 1 shows the mass of chips which accumulates in piles or mounds in one of the conventional apparatuses, said mass of chips requiring equalization or leveling to form the chip sheet;

FIGURES 2 and 3 schematically illustrate the construction of the apparatus according to the invention; and FIGURE 4 illustrates means for opening and closing the feed hopper to accomplish a weighing of chips fed to the hopper.

In a previously known apparatus in which the weighing hopper opens and closes periodically, a plurality of piles 1 is formed on the run-out belt, as illustrated in FIGURE 1a, said piles being located at a distance $x$ from one another on belt 3 provided with spreader plates 2. By means of an equalization or leveling roller (not shown), the piles (see FIGURE 1b) are smoothed out into a chip sheet of a desired thickness or layer height $s$. Here it is most essential that the size of piles 1 as well as their distance $x$ from one another be in a definite relationship to the predetermined thickness of chip sheet 4. If these three dimensions are not in proper proportion to one another, then sections 4a of reduced thickness will occur in the sheet, or the chip material will pile up in front of the rollers for regulating the height of the layer.

The apparatus according to the invention is provided with a feed belt 5 for conveying chips 7 to a weighing hopper 8 (FIGURE 2). The belt may be in the form of a needle lattice cloth and at whose upper end a conventional leveler roll 6 is positioned for leveling the chip material. When the weighing hopper 8 is open, the chip material 7 drops from conveyor belt 5 through the open hopper onto a chute 9 from which it is delivered in the form of sheets 10 on spreader plates 11 on a run-out table or run-out belt 12.

Weighing hopper 8 is provided with a balance arm 30 and an adjustable counterweight 13. The free end 14 of the balance arm operates a switch 15 which is connected by line 16 to an impulse transmitting time clock 17 (FIGURE 3) of conventional construction, such as an inertia-less timer provided with photo cells. One example of such a clock is that shown and described in Harkenrider Patent No. 2,544,155. This time clock has an oscillating pointer 17a which can move from position A in the direction of arrow B. The clock also has a contact 18 which may be in the form of a stationary contact on the clock, but which preferably is a selectively adjustable contact opposite the starting position of pointer 17a. Clock 17 is provided with a conventional impulse control and amplifier 19 which is connected either to conveyor belt 5 by line 20 or to run-out belt 12 by line 21. The lines 20 and 21 are in circuit with conventional electric motors (not shown) which drive the conveyor belt 5 and the run-out belt 12. By transmission of an impulse generated by the time clock 17 to either or both the electric motors for the conveyor belt 5 and the run-out belt 12, speed regulation of the motors and, consequently, of the belts driven thereby is effected. This speed regulation of the electric motors may be achieved in a number of conventional ways, which are well known and need not be described.

The weighing hopper 8 may be connected to the drive roller or to a guide roller of run-out belt 12 by way of line 22. In place of this arrangement it is also possible to provide spreader plates 11 with projections 23 at their ends, said projections cooperating with a contact 24 which is in turn connected to weighing hopper 8 and time clock 17.

FIGURE 4 illustrates the manner in which switch 24 is connected by line 22 to a magnet of weighing hopper 8. Balance arm 30 carrying adjustable counterweight 13 and pivotally mounted at 31, is provided with a magnet 32 whose magnetic core rod 33 is connected to the upper hinge 34 of the hopper, the hopper halves 35, 36 being swingable about said hinge during opening and closing. The two hopper halves are pivotally mounted in suitable longitudinal slots 37 to depending lugs 38. When the magnetic core is drawn upwardly, the two halves 35, 36 are closed, as shown in dotted lines. When the magnet is released, the hopper opens up and the two halves assume the position shown in solid lines. The operation of a weighing hopper of this type is well known. Magnet 32 is connected by way of line 22 with electrical power source 39 on the one hand, and with switch 24 on the other. Switch 24 is pivotally mounted at 40 and may be moved from the solid line position to the dotted line position by lugs or projections 23 on the trailing ends of the spreader plates 11 or by a suitable pin 41 on guide roll 45 (see FIGURE 2). Projections 23 are mounted laterally on the spreader plates 11, not in the downwardly projecting manner illustrated for purposes of simplicity only. When being tripped by pin 41, switch 24, of course, must be located within the rotational range of pin 41.

At its one end 24a, switch 24 is connected by way of a rod 42 to a time relay 43, which after a regulatable period of time will bring switch 24 back from its dotted line position into its solid line position. When in the dotted line position, switch 24 connects the electrical power source 39 to line 22 and to the magnet 32 by way of line 44, and closes the hopper 8 to start a weighing. After a time interval determined by the setting of the time relay 43, the time relay moves switch 24 to its solid line position, thus breaking the circuit and causing the hopper to open and deposit a mound of chips in the space between two spreader plates 11.

The operation of the whole apparatus is as follows:

Chips 7 conveyed by belt 5 pass through the opened weighing hopper 8 onto the chute 9 on which they may still be spread out due to the action of roll 6, and from there to spreader plates 11 on which a uniform or substantially uniform sheet 10 is formed. When a projection 23 on a spreader plate 11 strikes contact 24, weighing hopper 8 closes, a weighing starts and pointer 17a of clock 17 is simultaneously set in motion in the direction of arrow B. After a period of time when weighing hopper 8 has received a load corresponding in weight to that of adjustable counterweight 13, the free end 14 of balance arm 30 closes switch 15 which arrests pointer 17a. Contact 18 has been so positioned on clock 17 that it corresponds to the desired or nominal running time of pointer 17a on the clock 17, said time being the time desired for filling the weighing hopper with the required weight in respect to the desired thickness of the layer 10. The desired filling weight may be obtained by adjusting counterweight 13. If the actual time for attaining the desired filling weight in weighing hopper 8 is less than the desired time, i.e., if for example, pointer 17a stops in position A' (corresponding to arc $y$), it means that during the normal running of the apparatus with the hopper open, the rate of feed of chips from feed conveyor 5 through hopper 8 to spreader plates 11 is too great or the speed of run-out belt 12 is too slow to give the desired height of layer 10. If the actual time for attaining the desired filling weight in weighing hopper 8 is more than the desired time, i.e., if for example, pointer 17a stops in position A" (corresponding to arc $z$), it means that during the normal running of the apparatus with the hopper open, the rate of feed of chips from feed conveyor 5 is too small or the speed of run-out belt 12 is too great. In the first case, clock 17 delivers an impulse to impulse control 19 corresponding to arc $y$, and in the second case an impulse corresponding to arc $z$. From impulse control 19, control impulses corresponding to the position and size of arcs $y$ and $z$ are sent either to feed belt 5 by way of line 20 or to run-out belt 12 by way of line 21. One of the belts will be run faster or slower, depending on the impulse. If the speed of feed belt 5 is changed, there will be an actual change in the amount of material fed to run-out belt 12 per unit of time while hopper 8 is open. If, on the other hand, the speed of run-out belt 12 is changed, there will be a relative change in speeds of the belts 5 and 12.

The hopper 8 is closed either by projections 23 on spreader plates 11 or by run-out belt 12 by way of line 22 in such a manner that weighing of the chip material 7 begins at the point when the trailing end of a spreader plate 11 has passed below the bottom edge 9a of chute 9. Weighing and discharge of the weighed material ends before the leading end of the next spreader plate has passed below the edge 9a. Then the weighed chip material from hopper 8 will fall in a mound or pile 25 into the intervening space between the trailing end of one plate and the leading end of the next plate. If necessary, in order to scrape off excessive amounts of material in said piles, scrapers of a conventional type may be provided on the spreader plates.

At the end of the run-out belt 12, the piles 25 of chips fall through a sieve (not shown) into a receptacle 46 and from there they are again conveyed to pile 7, while the spreader plates 11 with the layers 10 thereon travel over the sieve and a roller conveyor 47 to a heated press 48.

By comparing the nominal time and the actual time to attain a given weight in the weighing hopper, the actual chip flow to the weighing hopper is of no consequence, which affords a high degree of accuracy in the device according to the invention, as compared to conventional devices. This also makes it possible to use only a very small quantity of chips for the comparative weighing in the weighing hopper. In FIGURE 2 the pile of chips 25 has been greatly exaggerated in size for purposes of clarity.

We claim:

1. Apparatus for regulating delivery of wood chips onto a run-out conveyor to obtain a layer of a given thickness of wood chips, which comprises a weighing hopper, a feed conveyor for delivering chips into said hopper, a run-out conveyor for receiving chips from said hopper, means for opening said hopper to discharge chips therein onto said run-out conveyor upon a given weight of chips being in said hopper, operable hopper closing means connected to said hopper for closing same to collect therein a batch of chips of said given weight, a timing device for comparing the actual time required to collect said batch with a given time for collecting said batch, initiating means connected to said timing device and to said operable hopper closing means and positioned for engagement by contact means movable with said run-out conveyor and spaced apart at given intervals thereon, said initiating means upon engagement by said contact means closing said hopper and starting said timing device, means for stopping said timing device operable upon opening of said hopper, said timing device generating an impulse which has a magnitude proportional to the difference in time between that required to collect said batch and said given time and a directional characteristic as to said actual time being less than or more than said given time, and impulse means connected to said timing device for transmitting said impulse to at least one of said run-out conveyor and said feed conveyor for regulating speed thereof to obtain said layer of said given thickness.

2. The apparatus of claim 1 characterized by said run-out conveyor including a plurality of spaced apart spreader plates movable therewith and positioned for receiving wood chips from said hopper, by said initiating means being a switch and by said contacting means being a member carried by the trailing end of each of said spreader plates.

3. The apparatus of claim 2 characterized by said given weight of said batch being related to that time required for the trailing end of one spreader plate and the leading end of the next following spreader plate to travel past a given point in a path of movement of said spreader plates.

4. Apparatus for regulating delivery of wood chips onto a run-out conveyor to obtain a layer of a given thickness of wood chips, which comprises a weighing hopper, a feed conveyor for delivering chips into said hopper, a run-out conveyor for receiving chips from said hopper, means for opening said hopper to discharge chips therein onto said run-out conveyor upon a given weight of chips being in said hopper, operable hopper closing means connected to said hopper for closing same to collect therein a batch of chips of said given weight, a timing device for comparing the actual time required to collect said batch with a given time for collecting said batch, initiating means connected to said timing device and to said operable hopper closing means and positioned for engagement by contact means movable with said run-out conveyor and spaced apart at given intervals thereon, said initiating means upon engagement by a contacting means closing said hopper and starting said timing device, means for stopping said timing device operable upon opening of said hopper, means connected to said timing device and operative in accordance with said time comparison for regulating the speed of at least one of said feed conveyor and said run-out conveyor to obtain said layer of said given thickness.

5. The apparatus of claim 4 characterized by said run-out conveyor including a plurality of spaced apart spreader plates movable therewith and positioned for receiving wood chips from said hopper, by said initiating means being a switch and by said contacting means being a member carried by the trailing end of each of said spreader plates.

6. The apparatus of claim 5 characterized by said given weight of said batch being related to that time required for the trailing end of one spreader plate and the leading end of the next following spreader plate to travel past a given point in a path of movement of said spreader plates.

7. A method for delivering wood chips onto a run-out conveyor to obtain a layer of a given thickness, which comprises feeding chips to and through a hopper onto said run-out conveyor, continuing feeding of said chips to said hopper while closing same and collecting therein a predetermined weight of said chips, opening said hopper immediately upon said predetermined weight of chips being collected therein, during said collecting measuring the time required therefor, starting said measuring upon closing said hopper and terminating said measuring upon opening said hopper, comparing said measured time with a given time desired for collecting said predetermined weight of chips to obtain a difference between said measured time and said given time, utilizing said difference to regulate at least one of rate of feed of said chips and of speed of said run-out conveyor to obtain said layer of said given thickness on said run-out conveyor, closing said hopper upon lapse of a given time interval and again collecting therein said predetermined weight of chips and again measuring the time required for collecting same.

8. The method of claim 7 characterized by said given time interval being determined by a given amount of travel of said run-out conveyor.

9. A method according to claim 7, wherein the time comparison weighings are made between periods of subtantially uniform volumetric regulation.

10. A method according to claim 7, wherein the wood chips are delivered onto spreader plates on the run-out conveyor and wherein the time comparison weighings are made in those intervals of time in which the trailing end of one spreader plate and the leading end of the following spreader plate move past the point of delivery of the chips to the run-out conveyor.

11. A method according to claim 7, wherein the time comparison weighings are made at constant time intervals.

12. The method of claim 7 characterized by generating an impulse from said difference between said measured time and said given time, said impulse having a magnitude proportional to said difference and a directional characteristic as to said measured time being less than or more than said given time, utilizing said impulse to regulate one of said rate of feed of said chips and of said speed of said run-out conveyor to obtain said layer of said given thickness.

13. The method of claim 12 characterized by said wood chips being delivered onto spreader plates on the run-out conveyor and by said measuring of said time being made in those intervals of time in which the trailing end of one spreader plate and the leading end of the following spreader plate move past a point of delivery of the chips onto the run-out conveyor.

References Cited by the Examiner
UNITED STATES PATENTS

| | | | |
|---|---|---|---|
| 2,523,179 | 9/50 | Alvord. | |
| 2,544,155 | 3/51 | Harkenrider | 177—121 X |
| 2,729,213 | 1/56 | Broekhuysen et al. | 177—121 X |
| 2,745,411 | 5/56 | Gilman et al. | 177—121 X |
| 2,822,028 | 2/58 | Himmelheber et al. | 222—55 X |
| 2,923,030 | 2/60 | Himmelheber et al. | 156—369 X |
| 3,051,219 | 8/62 | Kaiser | 156—373 X |
| 3,072,293 | 1/63 | Greten | 222—55 |

SAMUEL F. COLEMAN, *Primary Examiner.*
WILLIAM B. LA BORDE, *Examiner.*